(12) United States Patent  (10) Patent No.: US 9,082,316 B2
Baur  (45) Date of Patent: Jul. 14, 2015

(54) METHOD AND SYSTEM FOR STRATEGY DEVELOPMENT AND RESOURCE MANAGEMENT FOR ACHIEVING A GOAL

(75) Inventor: Marcus Baur, Kiel (DE)

(73) Assignee: GOALSCAPE SOFTWARE GMBH, Kiel (DE)

( * ) Notice: Subject to any disclaimer, the term of this patent is extended or adjusted under 35 U.S.C. 154(b) by 1899 days.

(21) Appl. No.: 11/705,193

(22) Filed: Feb. 12, 2007

(65) Prior Publication Data

US 2007/0190499 A1 Aug. 16, 2007

Related U.S. Application Data

(60) Provisional application No. 60/773,223, filed on Feb. 14, 2006.

(51) Int. Cl.
G06Q 10/00 (2012.01)
G09B 19/18 (2006.01)
G06Q 10/06 (2012.01)

(52) U.S. Cl.
CPC .......... *G09B 19/18* (2013.01); *G06Q 10/06398* (2013.01)

(58) Field of Classification Search
USPC .......... 709/201–246; 715/200–273, 700–866, 715/961; 707/600–674; 705/7.11–7.42
See application file for complete search history.

(56) References Cited

U.S. PATENT DOCUMENTS

| | | | | |
|---|---|---|---|---|
| 5,136,686 A | * | 8/1992 | Koza | 706/13 |
| 5,343,554 A | * | 8/1994 | Koza et al. | 706/13 |
| 5,491,779 A | * | 2/1996 | Bezjian | 345/440 |
| 5,657,428 A | * | 8/1997 | Tsuruta et al. | 706/46 |
| 6,327,551 B1 | * | 12/2001 | Peterson et al. | 703/1 |
| 6,359,635 B1 | * | 3/2002 | Perttunen | 715/834 |
| 6,446,060 B1 | * | 9/2002 | Bergman et al. | 707/770 |
| 6,549,219 B2 | * | 4/2003 | Selker | 715/834 |
| 6,990,437 B1 | * | 1/2006 | Abu El Ata | 703/2 |
| 7,035,786 B1 | * | 4/2006 | Abu El Ata et al. | 703/21 |
| 7,046,248 B1 | * | 5/2006 | Perttunen | 345/440 |
| 7,086,012 B1 | * | 8/2006 | Perttunen | 715/853 |
| 7,110,988 B1 | * | 9/2006 | Allemann et al. | 706/7 |
| 7,143,136 B1 | * | 11/2006 | Drenan et al. | 709/204 |
| 7,155,398 B2 | * | 12/2006 | Thier | 705/7.11 |
| 7,168,035 B1 | * | 1/2007 | Bell et al. | 715/234 |
| 7,287,017 B2 | * | 10/2007 | Pellinat | 706/59 |
| 7,325,010 B1 | * | 1/2008 | Kim | 1/1 |
| 7,359,865 B1 | * | 4/2008 | Connor et al. | 705/7.28 |

(Continued)

OTHER PUBLICATIONS

Michael J. Albers, Goal-driven Task Analysis: Improving Situation Awareness for Complex Problem-Solving, Association for Computing Machinery (ACM), (Sep. 1998) pp. 234-242.

(Continued)

*Primary Examiner* — Alan S Miller
(74) *Attorney, Agent, or Firm* — William L. Botjer

(57) ABSTRACT

A method, system and computer program product for strategy development and resource management for achieving a goal. The goal is divided into a plurality of first-generation sub-goals to form a goal hierarchy. At least one parameter is defined for the first-generation of sub-goals. The sub-goals are further divided into subsequent generations of sub-goals if the number of generations of sub-goals is less than a threshold value. A multi-level concentric representation of the goal hierarchy is created, based on the at least one parameter. The multi-level concentric representation is used for developing a strategy for achieving the goal.

22 Claims, 11 Drawing Sheets

(56) References Cited

U.S. PATENT DOCUMENTS

| | | | |
|---|---|---|---|
| 7,406,660 B1* | 7/2008 | Sikchi et al. | 715/236 |
| 7,640,221 B2* | 12/2009 | Baum | 706/46 |
| 7,672,958 B2* | 3/2010 | Meyer et al. | 707/758 |
| 7,692,653 B1* | 4/2010 | Petro et al. | 345/440 |
| 7,693,737 B2* | 4/2010 | Their et al. | 705/7.31 |
| 7,698,160 B2* | 4/2010 | Beaven et al. | 705/7.27 |
| 7,747,413 B2* | 6/2010 | Ramsey et al. | 702/179 |
| 7,756,901 B2* | 7/2010 | Thier | 707/802 |
| 7,774,388 B1* | 8/2010 | Runchey | 707/811 |
| 7,783,468 B2* | 8/2010 | Abu el Ata et al. | 703/22 |
| 7,827,050 B2* | 11/2010 | Bangel et al. | 705/7.36 |
| 8,294,719 B1* | 10/2012 | Perttunen | 345/440 |
| 2002/0122072 A1* | 9/2002 | Selker | 345/834 |
| 2003/0158766 A1* | 8/2003 | Mital et al. | 705/7 |
| 2004/0172320 A1* | 9/2004 | Spellman et al. | 705/8 |
| 2004/0186762 A1* | 9/2004 | Beaven et al. | 705/8 |
| 2005/0160084 A1* | 7/2005 | Barrett | 707/3 |
| 2005/0216324 A1* | 9/2005 | Maithell et al. | 705/8 |
| 2006/0212833 A1* | 9/2006 | Gallagher et al. | 715/848 |
| 2006/0250295 A1* | 11/2006 | Taguchi et al. | 342/36 |
| 2007/0136329 A1* | 6/2007 | Kussmaul et al. | 707/100 |
| 2008/0052358 A1* | 2/2008 | Beaven et al. | 709/205 |

OTHER PUBLICATIONS

Jonathan Arnowitz, Duco Fijma, Prof. Jouke Verlinden, Communicating a Task Analysis with Task Layer Maps, Association for Computing Machinery (ACM), (Aug. 2000) pp. 346-353.

* cited by examiner

METHOD AND SYSTEM FOR STRATEGY DEVELOPMENT AND RESOURCE MANAGEMENT FOR ACHIEVING A GOAL

REFERENCE TO RELATED APPLICATIONS

This application claims priority of U.S. provisional application Ser. No. 60/773,223 filed Feb. 14, 2006, the disclosure of which is hereby incorporated by reference.

BACKGROUND OF THE INVENTION

The present invention relates to the field of strategy development and resource management. More specifically, the present invention describes a method and a system for developing a strategy for achieving a goal.

A goal is an objective of a piece of work that is required to be completed with optimum utilization of resources. These resources may include time, money and the efforts of the team members involved in achieving the goal. Further, various factors such as goal management, goal importance, teamwork, individual skills and motivation, and knowledge transfer are involved in achieving the goal. These factors need to be critically handled to manage the resources efficiently. The optimum values of these factors determine the strategy for achieving the goal.

Various methods are currently used to develop a strategy for achieving the goal. One such method is breaking the goal into multiple sub-goals. These sub-goals may be broken down into further sub-goals, resulting in the addition of another level of break-up to the goal. The sub-goals are represented in different levels in a tree structure. The team members distribute resources such as time and money between the sub-goals. However, as the number of sub-goals increase, the complexity of the process, including the time involved in manually managing the goal and its sub-goals, also increases. Further, with the increase in complexity, it becomes difficult to identify the optimum values of the factors associated with optimum utilization of the resources. Moreover, it may become inefficient to communicate the information relevant to the goal and sub-goals among the team members.

In light of the above discussion, there is a need for a method and a system that provides a visual representation of the hierarchy of the goal and the sub-goals. The method should provide a visual representation to track the progress of the goal and sub-goals. Further, the method should provide a holistic approach to achieve the goal.

SUMMARY

An object of the present invention is to provide a multi-level concentric representation to display the sub-goals required to achieve a goal.

Another object of the present invention is to provide a multi-level concentric representation to display the relative importance of each sub-goal with respect to the other sub-goals.

Yet another object of the present invention is to provide a multi-level concentric representation to monitor the progress of a goal.

The present invention provides a method, a system and a computer program to develop a strategy and manage resources to achieve a goal. The goal is divided into a plurality of first-generation sub-goals to form a goal hierarchy. At least one parameter is defined for each of the first-generation sub-goals. The parameters help to provide relative importance to each sub-goal with respect to other sub-goals. The first-generation sub-goals may be divided into a plurality of subsequent generation sub-goals, until the number of generations seems most likely to achieve the goal. Each generation of the sub-goals represents a different level of the goal hierarchy.

The present invention provides a multi-level concentric representation to display the hierarchy of the goal and sub-goals. The concentric representation helps to monitor the progress of each sub-goal. Further, the progress of each sub-goal is used to track the progress of the goal. The method enhances the context and meaning of each sub-goal within the overall goal and thus helps in motivating the team that is responsible for achieving the goal. This motivation helps to retain the members of the team involved in achieving the goal. Moreover, the method enables easy transfer of information among the team members. This prevents negative conflict, due to misunderstanding, among the team members.

BRIEF DESCRIPTION OF THE DRAWINGS

The preferred embodiments of the invention will hereinafter be described in conjunction with the appended drawings, provided to illustrate and not to limit the invention, wherein like designations denote like elements, and in which.

DESCRIPTION OF THE PREFERRED EMBODIMENTS

The present invention describes a method, system and computer program product for strategy development and resource management to achieve a goal. Examples of the goal may include a vision, a mission, an objective, a program, a project, a plan, an action, a task, and the like. The goal is divided into a plurality of first-generation sub-goals that are required to achieve the goal. Each sub-goal has one or more parameters such as a definition, an importance coefficient, a lock state, an attachment state, and the percentage and time relating to completion associated with it. For instance, the lock state is a state that is activated when a sub-goal or goal is fixed. If a lock state corresponding to a sub-goal is 'true', the sub-goal is defined as locked. Another example is the attachment state, a parameter that gets activated if a file or a document needs to be attached with respect to a sub-goal or goal. The various parameters are explained in detail with respect to the subsequent figures. The first-generation sub-goals are divided into subsequent generation sub-goals until the combination of different generations of sub-goals seems the most likely option to achieve the goal. This combination of the goal and the sub-goals forms a goal hierarchy. Further, a favorite state is associated with each sub-goal of the goal hierarchy. Further, different generations of sub-goals form a multi-level concentric representation of the goal hierarchy to develop a strategy for achieving the goal.

Figure 1:
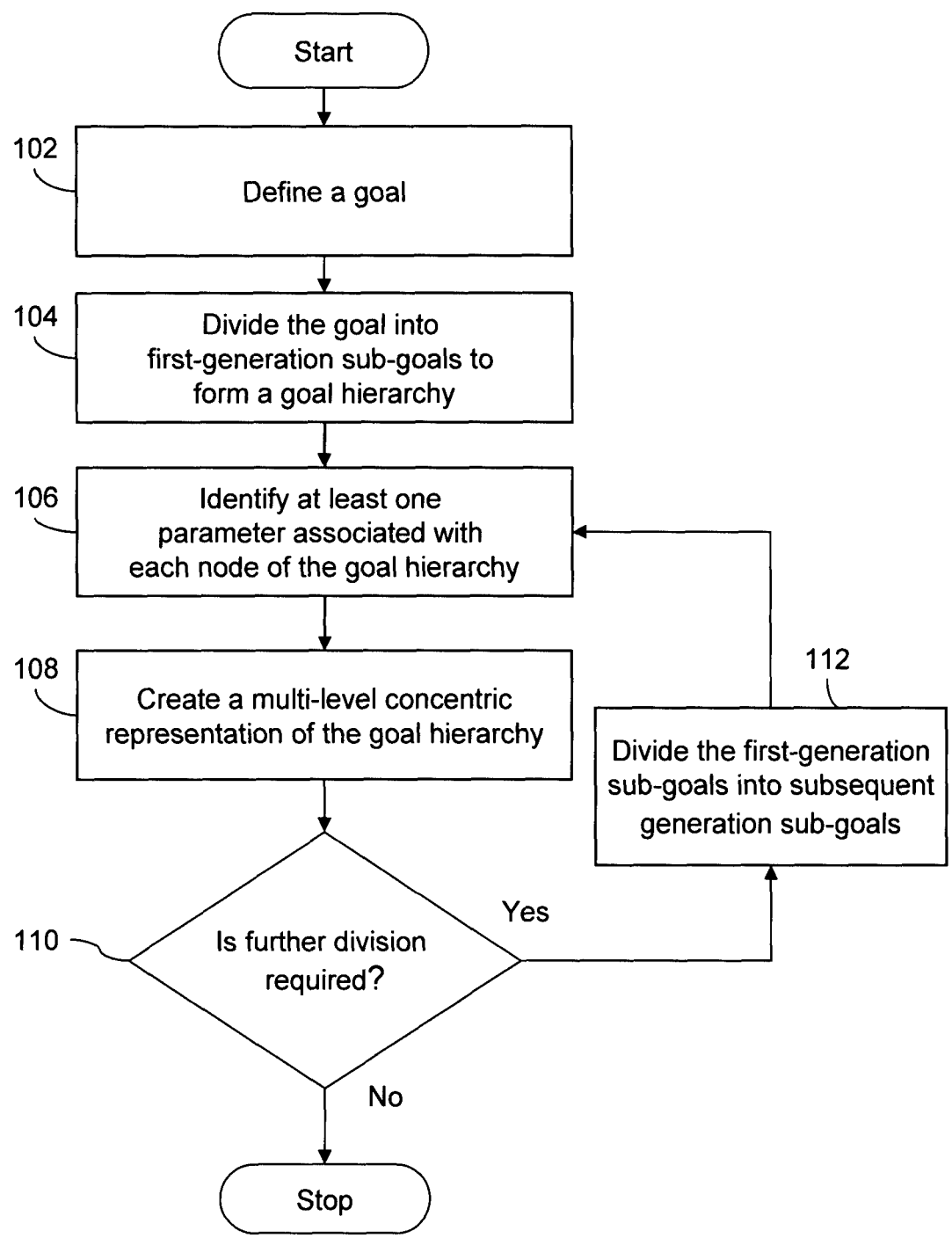
FIG. 1 is a flowchart of a method for developing a strategy for achieving a goal, in accordance with an exemplary embodiment of the present invention.

FIG. 1 is a flowchart of a method for developing a strategy to achieve a goal, in accordance with an exemplary embodiment of the present invention. In various embodiments of the present invention, the goal is related to different spheres, such as the field of business, sports, media, academics, research, law, administration, and the like, where a team of individuals is collectively engaged in accomplishing the goal. The individuals who are responsible for achieving the goal form the members of the team. In an embodiment of the present invention, an individual may be involved in achieving the goal. At step 102, one or more members of the team define the goal. At step 104, the goal is divided into a plurality of first-generation sub-goals to form a goal hierarchy. The goal and each of the plurality of first-generation sub-goals form one or more nodes of the goal hierarchy. Thereafter, at step 106, one or more members of the team identify at least one parameter associated with each node of the goal hierarchy. Examples of the parameters include, but are not limited to, a definition, an importance coefficient, a lock state, an attachment state, and the percentage and time relating to completion associated with the node. Further, the parameters include information such as the number of team members responsible for achieving the goal. In an embodiment of the present invention, the parameters include the various other factors required to develop a strategy for achieving the goal.

At step 108, a multi-level concentric representation of the goal hierarchy is created, based on the at least one parameter. The shape of the multi-level concentric representation is selected from the group that includes a pie chart, a pyramid, a square, a cone, a map, a sphere, a bar, and the like. This multi-level concentric representation has been explained in detail in conjunction with FIG. 2.

At step 110, it is verified whether the number of generations of sub goals into which the goal is divided is less than a threshold value. The threshold value is defined by the members of the team, based on the number of generations of sub-goals that are unanimously estimated to achieve the goal. If the condition mentioned above is satisfied at step 112, at least one of the first-generation sub-goals is divided into a plurality of subsequent generations' sub-goals. The plurality of subsequent generation sub-goals are added to the goal hierarchy. These subsequent generations form different levels of the multi-level concentric representation. Further, the above-mentioned steps are iterated for each sub-goal until the number of generations exceeds the threshold value.

Figure 2:
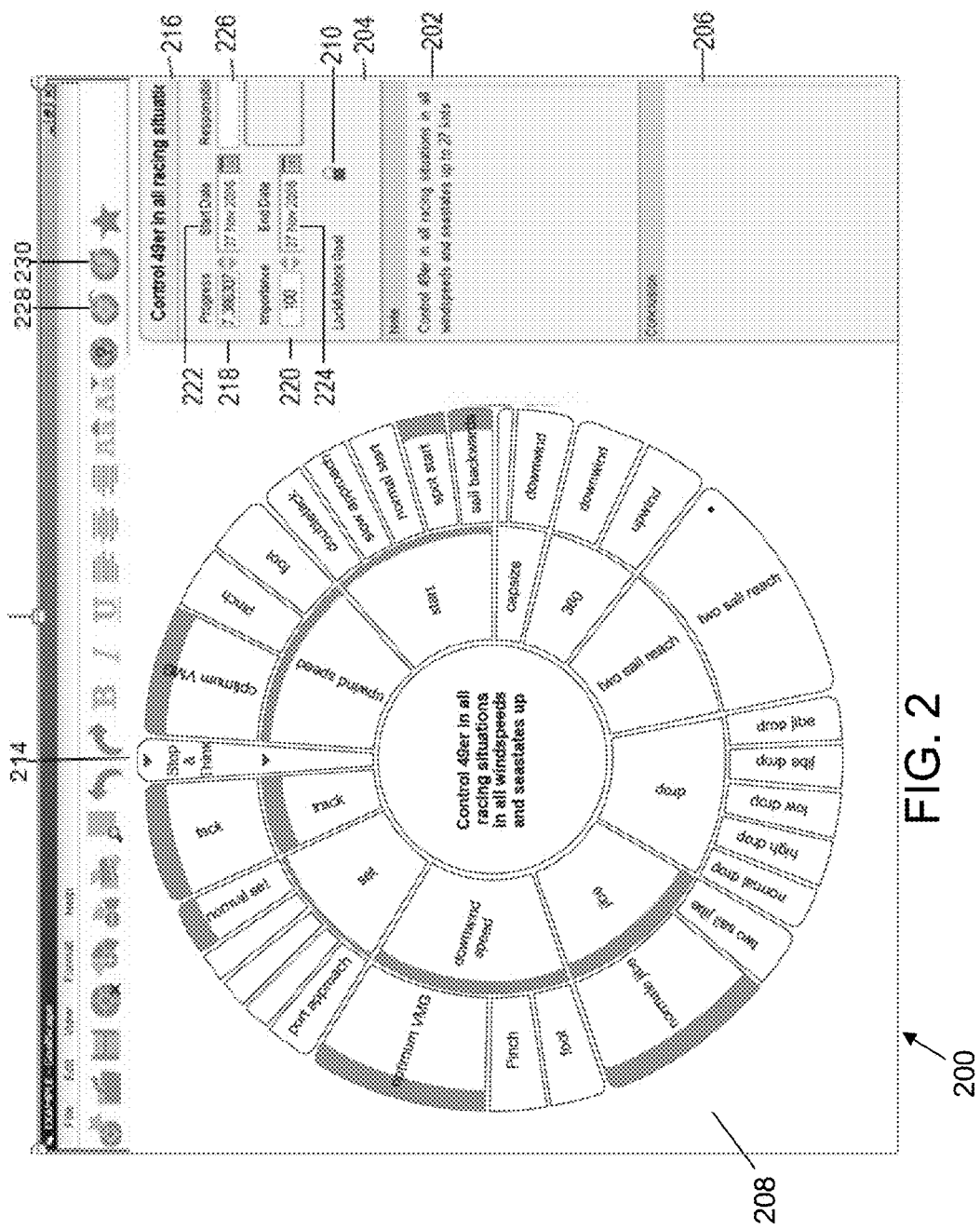
FIG. 2 is a screenshot of a software display for illustrating a strategy for achieving a goal, in accordance with an exemplary embodiment of the present invention.

FIG. 2 is a screenshot 200 of a software display used to develop a strategy for achieving a goal, in accordance with an exemplary embodiment of the present invention. In the embodiment, the software is used to achieve a goal in the sport of sailing. The software may be used by the sailing team responsible for achieving the goal. The sailing team includes one or more members involved in achieving the goal. Screenshot 200 includes a notes window 202, a sub-goal window 204, a conclusion window 206, a multi-level concentric representation 208, a lock 210, a responsibility assigned mark 212, and a control bar 214. Sub-goal window 204 further includes a title bar 216, a progress box 218, an importance box 220, a start date box 222, an end date box 224 and a responsibility box 226. In various embodiments, screenshot 200 also includes a goal focus icon 228 and a goal un-focus icon 230

Notes window 202 provides an interface for defining the goal. The goal may be defined by the one or more members of the sailing team. To plan a strategy for achieving the goal, the members divide the goal into a plurality of first-generation sub-goals. These first-generation sub-goals are divided into a plurality of subsequent generation sub-goals that are hereinafter referred to as higher generations of sub-goals. This division results in the formation of a hierarchical structure of the goal and the plurality of sub-goals, hereinafter referred to as a goal hierarchy. The subsequent generation of sub-goals represent different generations after the first-generation sub-goals, and form different levels of multi-level concentric representation 208. In an embodiment of the present invention, an interface for defining the plurality of sub-goals is provided in notes window 202. In an embodiment of the present invention, one or more documents may be attached with the goal or sub-goals. The documents are attached in notes window 202. In an embodiment of the present invention, the attached documents are displayed as icons in notes window 202.

Sub-goal window 204 provides an interface for defining name and at least one parameter, such as importance coefficient, the team members, time and percentage of completion, associated with the goal and sub-goals. Conclusion window 206 provides an interface, to enable the conclusion of the discussions associated with the goal and the sub-goals. In an embodiment of the present invention, the conclusion may include information pertaining to the sub-goals and the steps required for achieving the sub-goals. Multi-level concentric representation 208 provides a visual representation of the goal hierarchy, based on the at least one parameter. Lock 210 provides an interface for locking the at least one parameter associated with the sub-goals. The locking of the parameter of the sub-goals has been explained in detail in conjunction with FIG. 3. Control bar 214 manages the display of various generations of sub-goals in multi-level concentric representation 208. Managing the display of sub-goals has been explained in detail in FIG. 6a and FIG. 6b.

The one or more parameters are obtained from the interface provided by sub-goal window 204. For example, title bar 216 provides an interface for defining the name of the goal and sub-goals. The name provides a brief description of the goals and sub-goals as displayed in multi-level concentric representation 208. Progress box 218 provides an interface for defining the value of the percentage of completion associated with the sub-goals. Importance box 220 provides an interface for defining the value of the importance coefficient associated with the sub-goals. Start date box 222 and end date box 224 provides an interface for defining the time of completion, such as a start date and an end date, associated with the sub-goals. Responsibility box 226 provides an interface for assigning the responsibility for completion of the sub-goals to one or more team members. In an embodiment of the present invention, a visual representation is associated with these sub-goals to indicate assignment of the responsibility. For example, responsibility assigned mark 212 associated with sub-goal 'two sail reach' (as shown in FIG. 2) indicates assignment of the sub-goal to one or more team members. Conversely, absence of responsibility assigned mark 212 indicates that the sub-goal has not been assigned to the team members.

In a sailing race, different situations may arise, which require the development of a strategy before the commencement of the race. Further, a strategy is required to overcome situations with the optimum utilization of resources. Examples of these resources may include, but are not limited to, time, effort, and the money and skills of the members of the sailing team involved in achieving the goal. The members of the team define various situations pertaining to the sailing race in the form of goals. An example of a goal is 'Control 49er in all racing situations in all wind speeds and sea states up to 27 knots. The goal is defined in notes window 202. In an embodiment of the present invention, one or more members of the team define the goal in notes window 202. Notes window 202 also provides an interface, to enable the discussions associated with the goal and its sub-goals. In an embodiment of the present invention, the members may use this window to share their knowledge with the other members of the team, which may help in avoiding miscommunication and negative conflicts between the members.

Thereafter, the goal is selected and divided into a plurality of first-generation sub-goals in sub-goal window 204. Examples of the first-generation sub-goals include, but are not limited to, the upwind speed, tack, set, downwind speed, jibe, drop, two sail reach, 360 penalty turn, capsize and start. Further, the at least one parameter, such as importance coefficient, lock state, progress, time of completion, and the information pertaining to the members associated with each of the first-generation sub-goals, is defined in sub-goal window 204. For example, a parameter, such as the importance coefficient, defines the importance of the sub-goal with respect to the goal. The importance is represented by the sector size (sector angle) of the sub-goal in multi-level concentric representation 208.

In one example, the importance coefficient of the upwind speed, the tack, the set, the downwind speed, the jibe, the drop, the two-sail reach, the 360 penalty turn, the capsize and the start is 11, 7, 10, 19, 11, 11, 11, 6, 3 and 11, respectively. An annular section is used to represent the sub-goals in the multi-level concentric representation 208. A sector angle pertaining to the annular section is calculated for each of the first-generation sub-goals, based on their importance coefficient. In an embodiment of the invention, the sector angle is calculated as follows:

$$\text{Sector angle} = (\text{importance coefficient}/100)*360 \text{ degree} \qquad (i)$$

$$\text{Sector angle of 'downwind speed'} = (19/100)*360 = 68.4 \text{ degree}$$

Since the sector angle of the 'downwind speed' is the greatest, in comparison with the sector angle of the other first-generation sub-goals, the annular section of the downwind speed is greatest among the other sub-goals in multi-level concentric representation 208. The relative importance of the first-generation sub-goals is as follows:

11:7:10:19:11:11:11:6:3:11

Further, relative importance of the upwind speed is calculated as follows:

$$=11/(11+7+10+19+11+11+11+6+3+11)$$

An increase in the importance coefficient results in an increase in the relative importance of a sub-goal in achieving the goal. The importance coefficient helps the team members to efficiently manage and dynamically redistribute resources such as effort and money among the sub-goals.

In an embodiment of the present invention, an additional sub-goal (not shown in FIG. 2) is added in the first-generation sub-goals. Addition of the additional sub-goal alters the sector angle of each of the first-generation sub-goals. However, the relative importance of the first-generation sub-goals remains the same. The importance coefficient of the additional sub-goal is calculated as follows:

Importance Coefficient

=(Total of the importance coefficient of unlocked first-generation sub-goals)/(number of sub-goals+1)

$$=(11+7+10+19+11+11+11+6+3+11)/(10+1)=9 \qquad (ii)$$

The revised importance coefficient of other first generation sub-goals is calculated based on the difference remaining after subtracting the total of the importance coefficient of unlocked first generation sub-goals with the importance coefficient of the additional sub-goal. The revised importance coefficient of the first generation sub-goals is calculated as follows:

Importance Coefficient of Upwind Speed

=Relative importance of upwind speed in unlocked goals*(Total importance coefficient of unlocked first generation sub-goals−importance coefficient of the additional sub-goal)

$$=(11/(11+7+10+19+11+11+11+6+3+11))*(100-9)$$

$$=10.1 \qquad (iii)$$

Importance Coefficient of the Tack $$=(7/(11+7+10+19+11+11+11+6+3+11))*(100-9)$$

$$=6.37$$

Similarly, importance coefficient of other first-generation sub-goals, such as the set, the downwind speed, the jibe, the drop, the two-sail reach, the 360 penalty turn, the capsize and the start is 9.1, 17.29, 10.1, 10.1, 10.1, 5.46, 2.73 and 10.1 respectively.

In an embodiment of the present invention, the revised sector angle of the upwind speed is calculated as follows:

Sector angle of 'upwind speed'=(importance coefficient/100)*360 degree $$=(10.1/100)*360$$

$$=36.6 \qquad (iv)$$

Similarly, revised sector angle of remaining first-generation sub-goals is calculated. In an embodiment of the present invention, a sub-goal may be deleted from multi-level concentric representation 208. The deletion may alter the importance coefficient and sector angle of the remaining sub-goals. The importance coefficient and sector angle of the remaining sub-goals are calculated in a similar manner as described above.

Moreover, the members track the overall progress of the plan, to achieve the goal by monitoring the progress of the sub-goals. A parameter such as progress helps in determining the percentage of completion of each sub-goal. The annular section, used to represent a sub-goal in multi-level concentric representation 208, is colored in a specific color such as dark grey, based on the percentage of completion of the sub-goal. In an embodiment of the present invention, if 50 percent of a sub-goal is completed, an annular section pertaining to 50 percent of the width of the annular section is colored in a specific color such as dark grey. In an embodiment of the present invention, the annular section is colored from the circumference of the annular section toward the center of the section. Therefore, the color of the annular section helps to track visually the progress of the sub-goal. This decreases the time and complexity involved in planning the goal. Further, the percentage completion of the sub-goal may be used for proper utilization of resources such as the number of members involved in achieving the sub-goal.

In one example, the sailing goal is divided into two sub-goals such as mastering the situations such as jibe, and tack. Mastering jibe refers to mastering the skill of turning the stern of a sailing boat through the wind such that the direction of the wind changes from one side of the boat to the other. Mastering the tack refers to a maneuver where a sailing boat turns its bow through the wind so that the wind changes from one side of the boat to the other. In an embodiment of the present invention, if 80 percent of a sub-goal, such as mastering jibe, has been completed, the members who were involved in achieving the sub-goal are shifted to achieve other sub-goals, such as mastering tack, to achieve the goal more efficiently.

In an embodiment of the present invention, first-generation sub-goals such as the 'upwind speed' are divided into a plurality of second-generation sub-goals such as optimal Velocity Made Good (VMG), pinch, and foot. In an embodiment of the present invention, multi-level concentric representation 208 enables the team members to align the sub-goals with earlier generation of sub-goals. The alignment of the sub-goals helps the members to identify unnecessary sub-goals. In an embodiment of the present invention, these unnecessary sub-goals may be deleted from the multi-level concentric representation 208. Further, the alignment of sub-goals also helps in identifying the appropriate position of the sub-goals. A sub-goal may be shifted from a first position in multi-level concentric representation 208 to a second position. Shifting of the sub-goal has been explained in detail in conjunction with FIG. 4a and FIG. 4b.

In various embodiments of the present invention, an increase in the subsequent generation of sub-goals may result in an increase in the size of multi-level concentric representation 208. This may result in an overhead in managing the display of multi-level concentric representation 208. For example, details of the sub-goals, such as name, may not be visible in multi-level concentric representation 208. The display may be managed by focusing a sub-goal from a higher generation to the center of another multi-level concentric representation. In an embodiment of the present invention, goal focus icon 228 is used to drop the sub-goal to the center of multi-level concentric representation 208. Further, goal un-focus icon 230 decentralizes the sub-goal to its original position.

In various embodiments, the focusing or zooming can be achieved by double-clicking on a subgoal. This allows the subgoal to drop to the center of multi-level concentric representation 208. Further focusing is possible by double-clicking another subgoal.

For zooming back out, the goal at the center of multi-level concentric representation 208 is double clicked. This step allows the goal to become a subgoal.

Figure 5A:
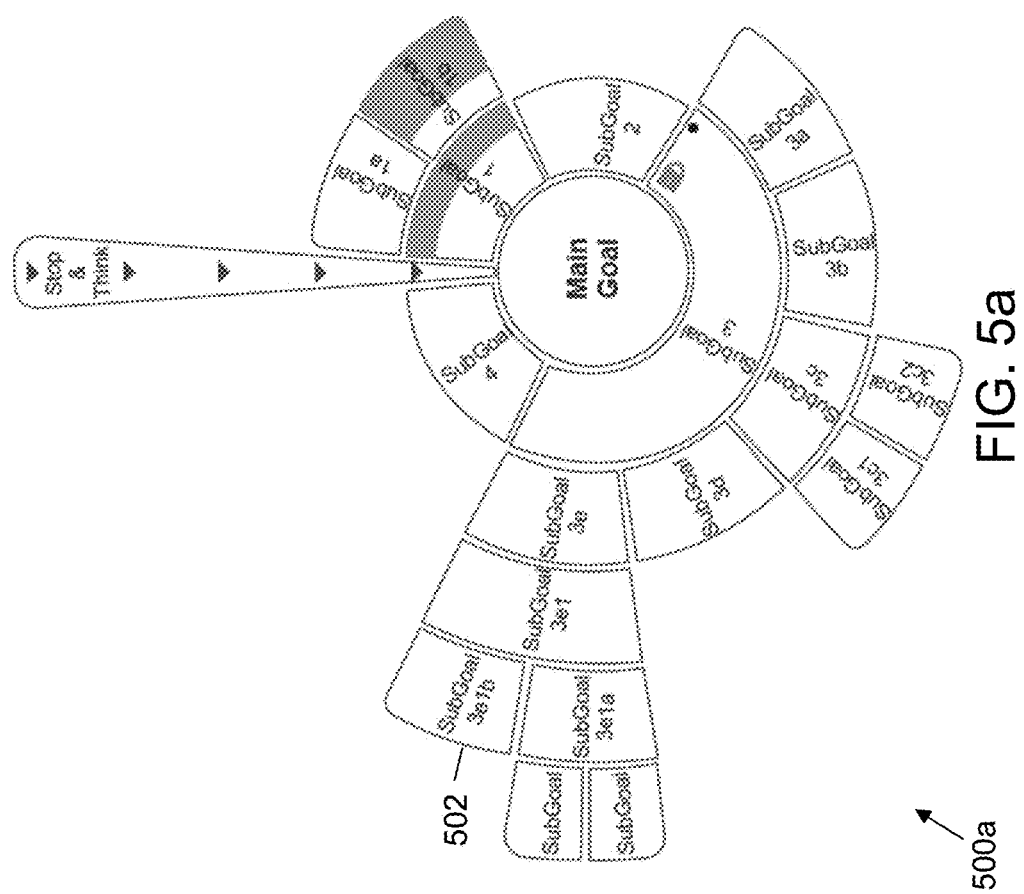
FIG. 5a and FIG. 5b are a screenshot 500a and a screenshot 500b, respectively, of the concentric representation portion of the software display illustrating the focusing of a sub-goal, in accordance with an exemplary embodiment of the present invention.
Figure 5B:
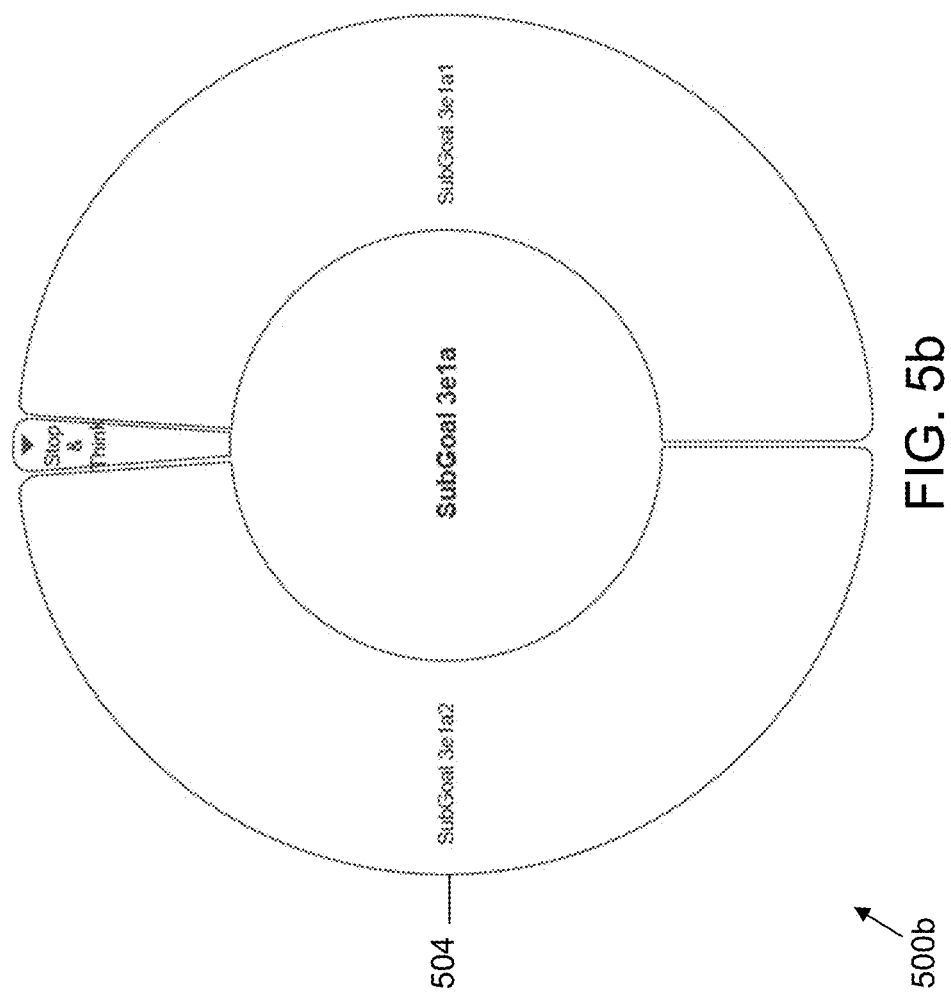

The focusing of the sub-goal has been explained in detail in conjunction with FIG. 5a and FIG. 5b. In an embodiment of the present invention, the display of higher generations may be managed by control bar 214. Managing the display of higher generations using control bar 214 has been explained in detail in conjunction with FIG. 6a and FIG. 6b.

In another embodiment of the present invention, the software is used to create a business plan for launching a product in the market. The business plan is divided into a plurality of first-generation sub-goals. The first-generation sub-goals may include the market share, target customers, advertising, supply-chain management, the distribution channel, capital investment, the risk involved, and pricing. The parameters associated with each of the first-generation sub-goals are defined. These parameters may include time, manpower and the percentage of completion of a sub-goal. The first-generation sub-goals are then divided into a subsequent generation of sub-goals, to develop an efficient strategy for the successful launch of the product. A multi-level concentric representation of the goal and sub-goals is created, which is used to develop a strategy for launching the product. The software may also serve as a budgeting and time management tool for a business project.

In one example, the members may be present at geographically different locations, working in a team to plan a strategy for achieving the goal. These members may be connected and may communicate through a network such as the Internet, and commonly access the software through it. Examples of different methods for communication include, but are not limited to, video conferencing, online meetings and teleconferencing systems, which are used in conjunction with the software.

In an embodiment of the invention, the software is used to define a methodology for addressing a goal, such as winning a cycling race. The methodology is represented in a multi-level concentric representation. This multi-level concentric representation may be launched as a product in the market. The representation serves as a guiding tool for others, to develop skills in the field of cycle racing.

Figure 3:
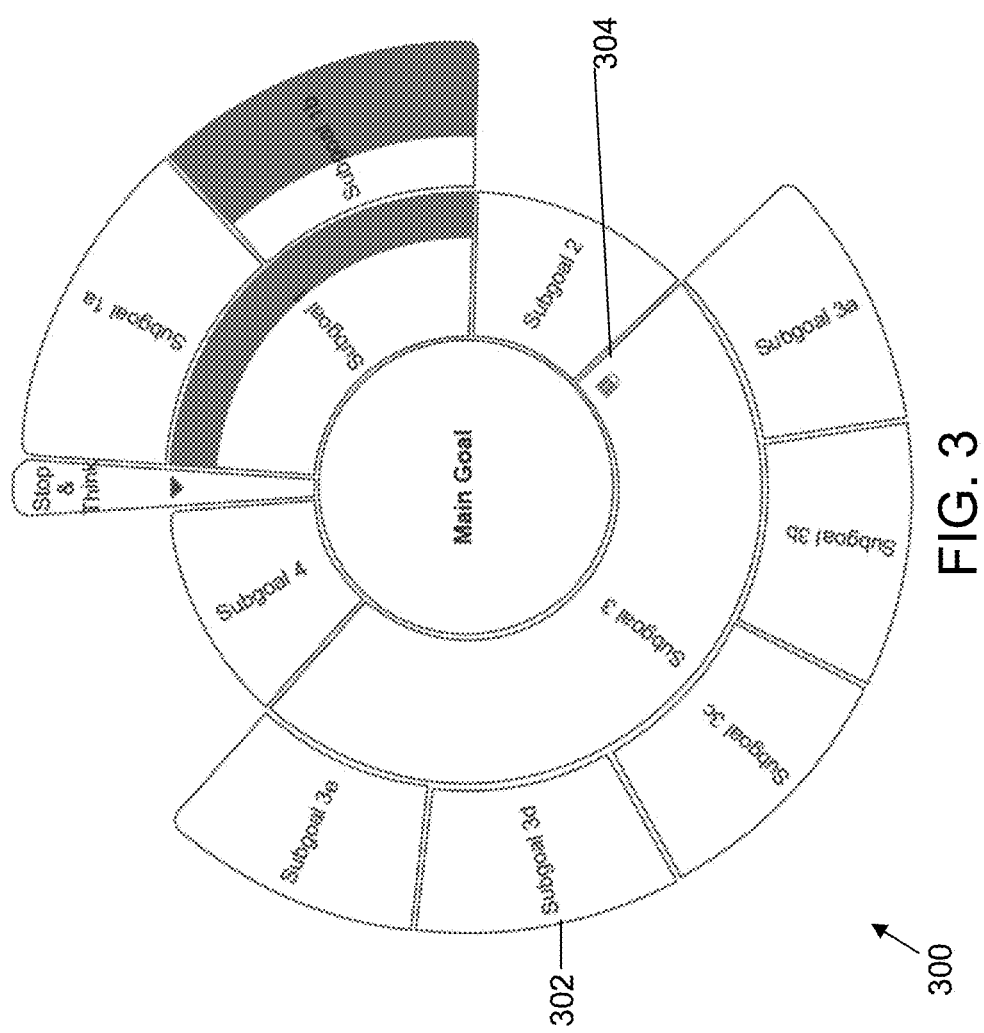
FIG. 3 is a screenshot of the concentric representation portion of software display for illustrating the locking of a sub-goal, in accordance with an exemplary embodiment of the present invention.

FIG. 3 is a screenshot of the concentric representation portion of software display for illustrating the locking of a sub-goal, in accordance with an exemplary embodiment of the present invention. Screenshot 300 includes lock 210, a multi-level concentric representation 302 and a lock mark 304. The multi-level concentric representation 302 includes a main goal that is divided into a subgoal 1, a subgoal 2, subgoal 3 and a subgoal 4, hereinafter referred to as a first-generation of sub-goals. The importance coefficient of subgoal 1, subgoal 2, subgoal 3 and subgoal 4 is 25, 12.25, 50 and 12.25, respectively. Subgoal 3 is further divided into a subgoal 3a, a subgoal 3b, a subgoal 3c, a subgoal 3d and a subgoal 3e, hereinafter referred to as a second-generation of sub-goals. In an embodiment of the present invention, the second-generation of sub-goals may be divided into subsequent generations of sub-goals, referred to with additional letters and numbers such as 3e1b; 4a2c and the like.

Subgoal 3 is selected, as illustrated in FIG. 3. In an embodiment of the present invention, the selection of a sub-goal alters the color of the sub-goal. Lock 210 locks at least one parameter, such as an importance coefficient, associated with the selected sub-goal, based on the state of the at least one parameter, such as lock state. For example, if the lock state corresponding to a sub-goal is 'true', the sub-goal is defined as locked. Locking the subgoal 3 fixes the value of the importance coefficient associated with the sub-goal 3. For example, the importance coefficient of the subgoal 3 may be fixed if the budget associated with the subgoal 3 exceeds a predetermined limit. In an embodiment of the present invention, lock mark 304 is associated with subgoal 3. The presence of lock mark 304 indicates that the state of subgoal 3 is locked. Conversely, the absence of lock mark 304 indicates that the state of sub-goal 3 is unlocked.

In an embodiment of the present invention, the addition of more sub-goals at the first-generation of the goal hierarchy does not change the importance coefficient of the subgoal 3. However, is it apparent that the addition of more sub-goals at the first-generation leads to change in the size of the remaining sub-goals at the first-generation. For example, a subgoal 5 (not shown in FIG. 3) is added to the first-generation of sub-goals. The relative importance of unlocked sub-goals, such as subgoal 1, subgoal 2 and subgoal 4, is as follows:

=25:12.25:12.25

=25/(25+12.25+12.25):12.25/(25+12.25+12.25): 12.25/(25+12.25+12.25)

=½:¼:¼

Since status of subgoal 3 is locked, the importance coefficient of subgoal 5 is calculated as follows:
Importance Coefficient of Subgoal 5

=(Total importance coefficient of unlocked first-generation sub-goals)/(number of sub-goals+1)

=(50)/(3+1)=12.5    (v)

Sector angle to display subgoal 5 in multi-level concentric representation 302 is calculated as follows:

=(12.5/100)*360 degree

=45

The revised importance coefficient of subgoal 1 is calculated as follows:

=(relative importance of subgoal 1)*(Total importance coefficient of unlocked first generation sub-goals–importance coefficient of subgoal 5)

=(½)*(50−12.5)

=18.75    (vi)

Similarly, the revised importance coefficient of subgoal 2 and subgoal 5 is 9.375 and 9.375, respectively.
Revised sector angle of subgoal 1 is calculated as follows:

=(18.75/100)*360 degree

=67.5 degree

Similarly, revised sector angle of subgoal 2 and subgoal 4 is 33.75 and 33.75, respectively. In an embodiment of the present invention, sector angle corresponding to subsequent addition of sub-goals will be calculated in a similar manner.

Figure 4A:
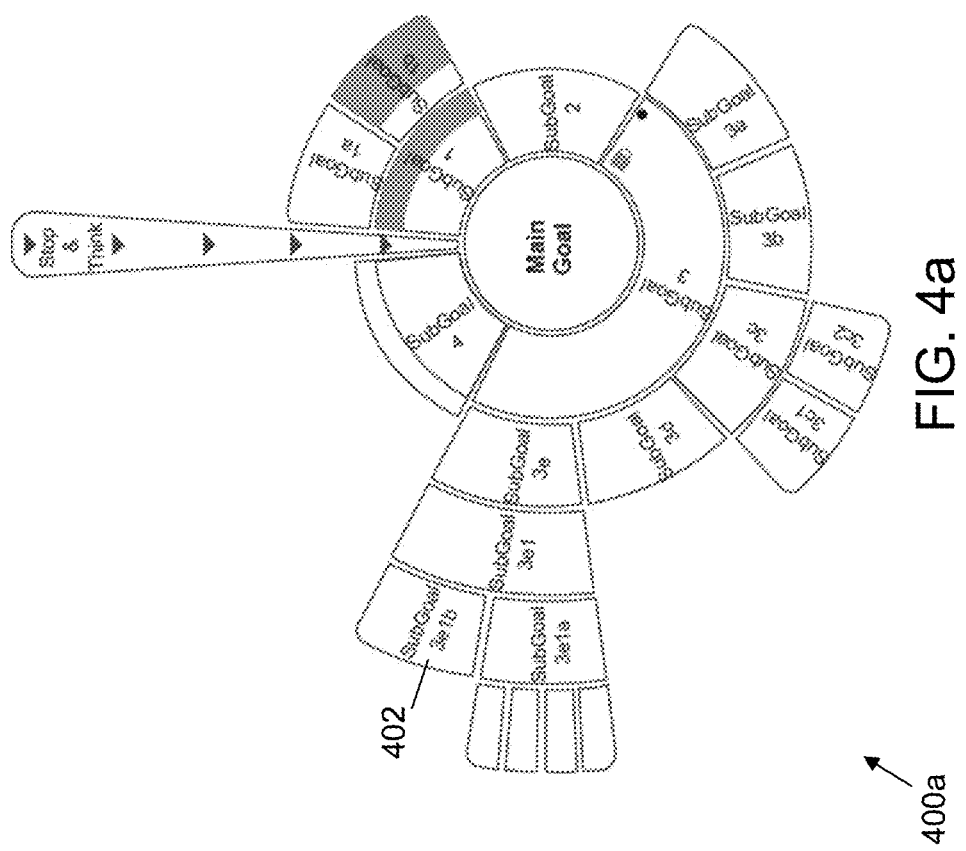
FIG. 4a and FIG. 4b are a screenshot 400a and a screenshot 400b, respectively, of the concentric representation portion of the software display illustrating the shifting of the position of a sub-goal, in accordance with an exemplary embodiment of the present invention.
Figure 4B:
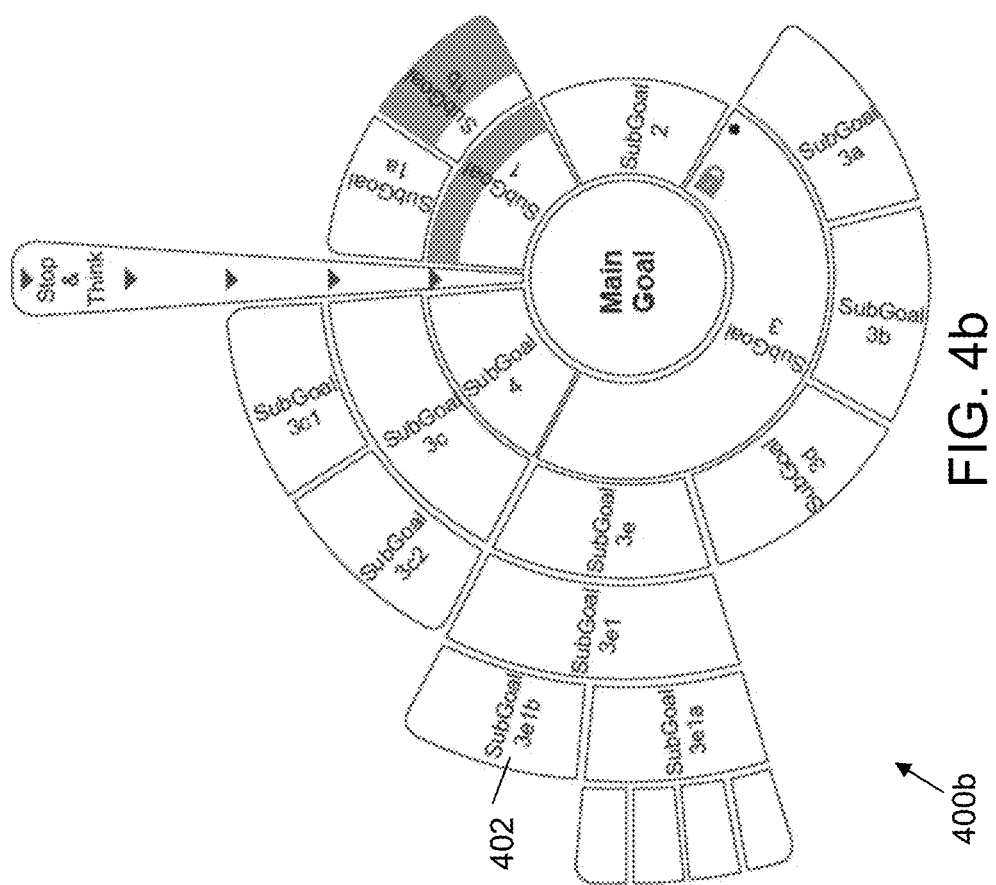

FIG. 4a and FIG. 4b are a screenshot 400a and a screenshot 400b, respectively, of the concentric representation portion of the software display illustrating the shifting of the position of a sub-goal, in accordance with an exemplary embodiment of the present invention. Screenshot 400a includes a multi-level concentric representation 402 that illustrates subgoal 3c in a first position. The first position defines subgoal 3c as a sub-goal of subgoal 3. Subgoal 3c is shifted from the first position to a second position, based on at least one parameter, such as the time and percentage completion of the subgoal 3c. The second position defines the subgoal 3c as a sub-goal of subgoal 4. The second position of subgoal 3c is illustrated in FIG. 4b. In various embodiments of the present invention, subgoal 3c may be shifted to any position under any generation in multi-level concentric representation 402.

In an embodiment of the present invention, shifting of a sub-goal to another position may alter the importance coefficient of other sub-goals. For example, shifting of subgoal 3c to first-generation of sub-goals alters the sector angles of the first-generation of sub-goals, such as subgoal 1, subgoal 2, subgoal 3 and subgoal 4, and the second-generation of sub-goals, such as subgoal 3a, subgoal 3b, subgoal 3d and subgoal 3e. The sector angles are calculated as described in FIG. 2 and FIG. 3.

FIG. 5a and FIG. 5b are a screenshot 500a and a screenshot 500b, respectively, of the concentric representation portion of the software display illustrating the focusing of a sub-goal, in accordance with an exemplary embodiment of the present invention. Screenshot 500a includes a multi-level concentric representation 502, goal focus icon 228 (shown in FIG. 2) and goal un-focus icon 230 (shown in FIG. 2). Multi-level concentric representation 502 includes first-generation of sub-goals such as a subgoal 1, a subgoal 2 and a subgoal 3, a second-generation of sub-goals, such as a subgoal 3e, a subgoal 3b, a third-generation of sub-goals, such as a subgoal 3e1 and a subgoal 3c1, a fourth-generation of sub-goals, such as subgoal 3e1a and a subgoal 3e1b and a fifth generation of sub-goals. Screenshot 500b includes a multi-level concentric representation 504.

Multi-level concentric representation 502 includes subgoal 3e1a. The subgoal 3e1a is selected as illustrated in FIG. 5a. The subgoal 3e1a is focused to form multi-level concentric representation 504. The subgoal 3e1a is focused at the center of multi-level concentric representation 504, as illustrated in FIG. 5b. The sub-goals of the subgoal 3e1a, such as subgoal 3e1a and subgoal 3e1b, form the first-generation of sub-goals, such as subgoal 3e1a2 and subgoal 3e1a3, in multi-level concentric representation 504. In an embodiment of the present invention, the subgoal 3e1a is focused by double clicking the mouse on the subgoal 3e1a. In an embodiment of the present invention, goal focus icon 228 is used to focus the subgoal 3e1a on the center of multi-level concentric representation 504. Further, goal un-focus icon 230 decentralizes subgoal 3e1a to its original position.

Figure 6A:
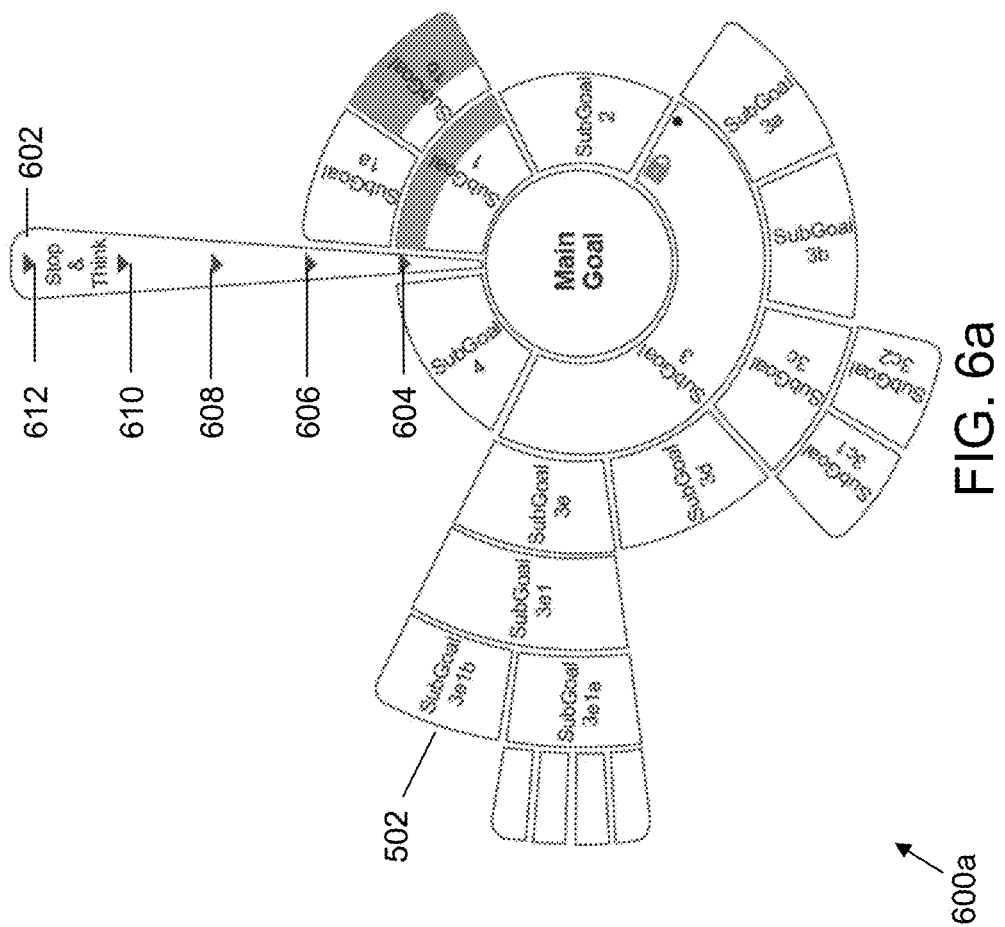
FIG. 6a and FIG. 6b are a screenshot 600a and a screenshot 600b, respectively, of the concentric representation portion of the software display illustrating the management of the display of the generation of sub-goal, in accordance with an exemplary embodiment of the present invention.
Figure 6B:
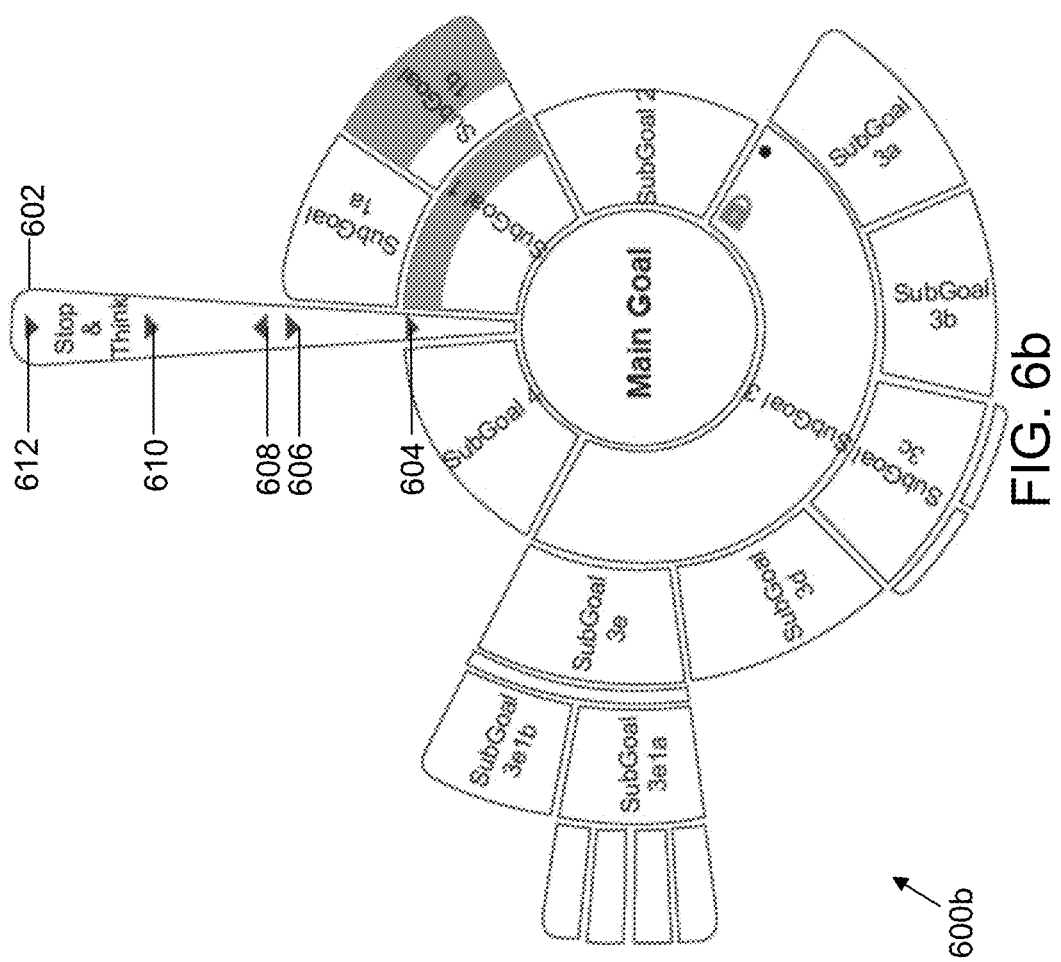

FIG. 6a and FIG. 6b are a screenshot 600a and a screenshot 600b, respectively, of the concentric representation portion of the software display illustrating the management of the display of the generation of sub-goal, in accordance with an exemplary embodiment of the present invention. Screenshot 600a includes multi-level concentric representation 502, a control bar 602. Control bar 602 includes a flag 604, a flag 606, a flag 608, a flag 610 and a flag 612 that are associated with the first-generation of sub-goals, the second-generation of sub-goals, the third-generation of sub-goals, the fourth-generation of sub-goals, and the fifth generation of sub-goals, respectively. Flag 608 manages the display of the third-generation of sub-goals by collapsing each sub-goal present in the third-generation of sub-goals from a first size to a second size. For example, the first size and the second size of the third-generation have been illustrated in FIG. 6a and FIG. 6b, respectively. In an embodiment of the present invention, flag 608 expands the third-generation from the second size to the first size.

Figure 7:
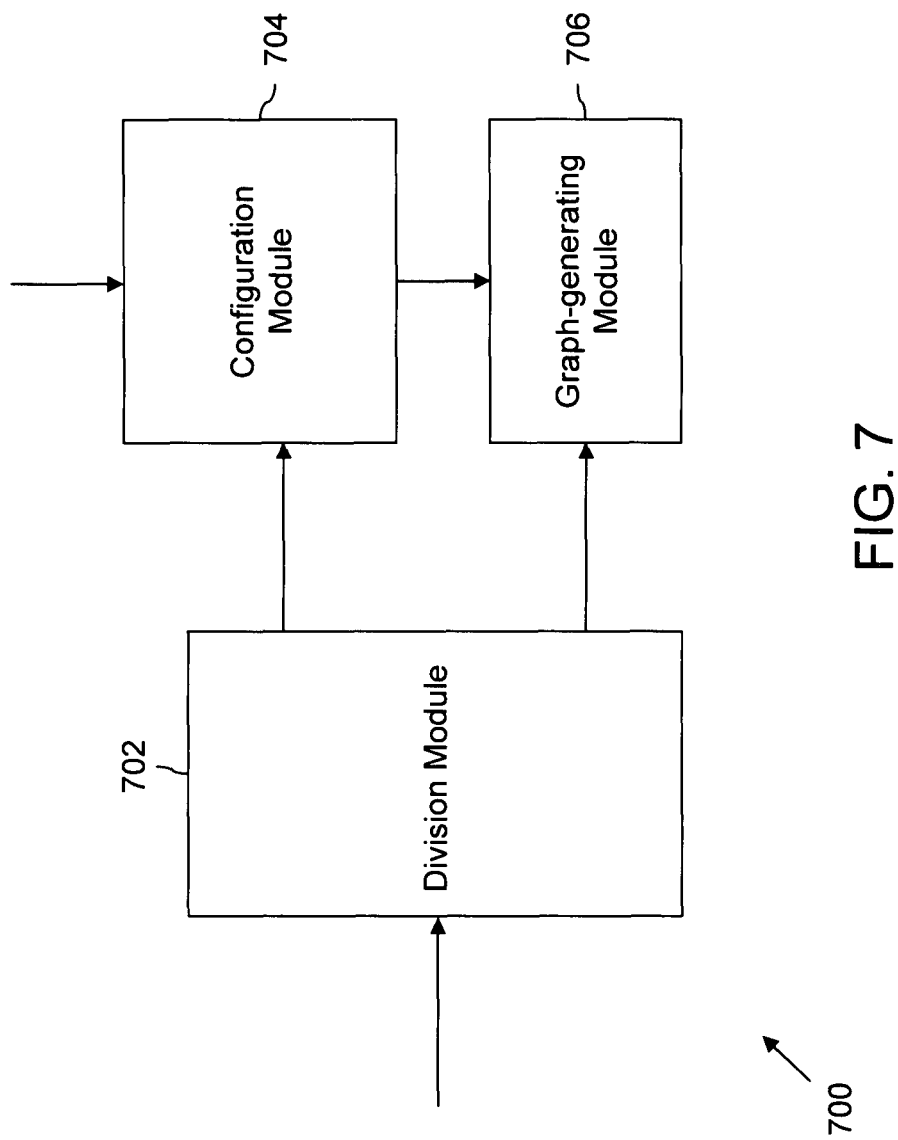
FIG. 7 is a schematic representation of a goal management system 700 for developing a strategy for achieving a goal, in accordance with an exemplary embodiment of the present invention.

FIG. 7 is a schematic representation of a goal management system 700 for developing a strategy for achieving a goal, in accordance with an exemplary embodiment of the present invention. Goal management system 700 includes a division module 702, a configuration module 704, and a graph-generating module 706.

Division module 702 divides the goal into a plurality of sub-goals to form a goal hierarchy. The goal, and each of the plurality of sub-goals, is represented as one or more nodes of the goal hierarchy. Configuration module 704 defines at least one parameter that is associated with each of the one or more nodes of the goal hierarchy. Examples of the at least one parameter include, but are not limited to, a definition, an importance coefficient, a lock state, and the percentage and time of completion of a sub-goal. In an embodiment of the present invention, the parameter also includes information pertaining to team members responsible for the completion of the sub-goal. Graph-generating module 706 generates a multi-level concentric representation of the goal hierarchy.

A team member provides information related to the goal to division module 702. In various embodiments of the present invention, the user may be a human being or a computer program. Division module 702 divides the goal into the plurality of sub-goals to form the goal hierarchy. Further, division module 702 provides information pertaining to the goal hierarchy to configuration module 704. The team member provides the parameter associated with the sub-goals to configuration module 704. Graph-generating module 706 generates the multi-level concentric representation of the goal hierarchy, based on the parameters.

In an embodiment of the present invention, the shape of the multi-level concentric representation is selected from the group that includes a pie chart, a pyramid, a square, a hexagon, a cone, a map, a sphere, a bar, a cylinder, or their combination thereof. In various embodiments of the present invention, the multi-level concentric representation may be a two-dimensional (2D) or a three-dimensional (3D) figure. In an embodiment of the present invention, the plurality of sub-goals is divided into a subsequent generation of sub-goals. These subsequent generations are added to the goal hierarchy.

In various embodiments of the present invention, goal management system 700 may be implemented as desktop software, network software or a web-based application. In various embodiments of the present invention, different elements of goal management system 700, such as division module 702, configuration module 704 and graph-generating module 706, may be implemented as hardware modules, software modules, firmware, or their combination thereof.

Figure 8:
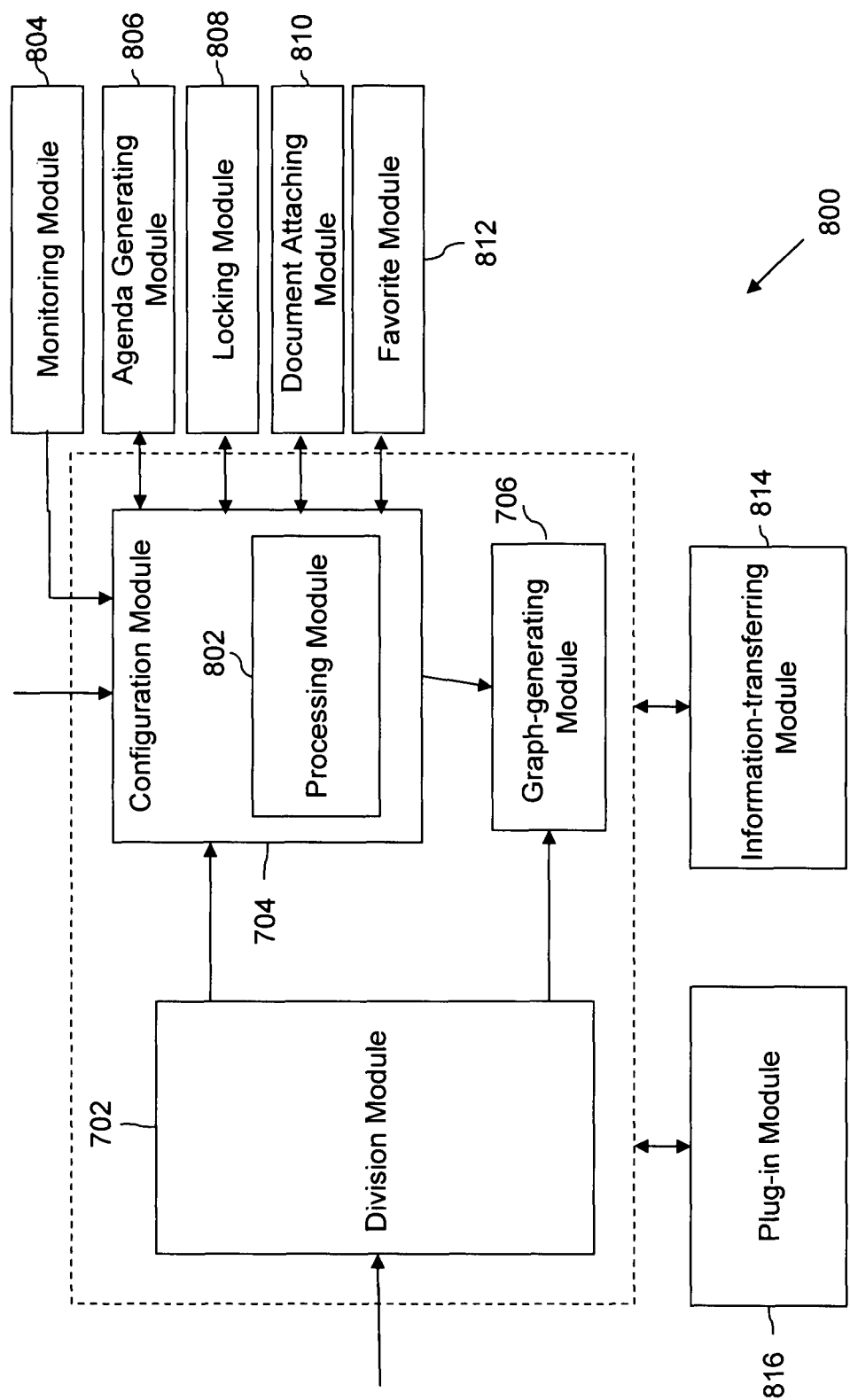
FIG. 8 is a schematic representation of a goal management system 800 for developing a strategy for achieving a goal, in accordance with another embodiment of the present invention.

FIG. 8 is a schematic representation of a goal management system 800 for developing a strategy for achieving a goal, in accordance with another embodiment of the present invention. Goal management system 800 includes division module 702, configuration module 704 having a processing module 802, graph-generating module 706, a monitoring module 804, an agenda generating module 806, a locking module 808, a document attaching module 810, a favorite module 812, an information-transferring module 814, and a plug-in module 816.

Processing module 802 processes the parameters associated with the one or more nodes of the goal hierarchy. Monitoring module 804 tracks the progress of the goal and sub-goals, based on the parameters. For example, the progress of the goal may be tracked, based on the percentage completion of its sub-goals. Agenda generating module 806 generates an agenda associated with the one or more nodes of the goal hierarchy, for the use in and preparation for team meetings. The agenda includes information related to the goal, the sub-goals, and the parameters. Locking module 808 locks the at least one parameter associated with at least one of the one or more nodes. Document attaching module 810 attaches one or more document with at least one of the one or more nodes. Favorite module 812 stores at least one of the one or more nodes as favorite, based on a favorite state. The favorite state is associated with each of the one or more nodes. Plug-in module 816 integrates one or more plug-ins with the goal management system 800. Information-transferring module 814 transfers the information related to the one or more nodes from a first format to a second format.

Processing module 802 processes the parameters, such as the percentage of completion of sub-goals, and provides them to graph-generating module 706. In various embodiments of the present invention, processing module 802 provides the at least one parameter to monitoring module 804, agenda generating module 806, locking module 808, document attaching module 810, and favorite module 812. In an embodiment of the present invention, processing includes calculating the dimensions and angles required for visual representation of the goal hierarchy. Monitoring module 804 tracks the progress of the goal, based on the percentage of completion of each of the one or more nodes of the goal hierarchy. Further, agenda generating module 806 creates an agenda for the goal and sub-goals, based on the parameters.

Locking module 808 locks at least one parameter, such as importance coefficient, associated with the goal or the sub-goal, based on the lock state of the goal or sub-goal. For example, if the value of the lock state associated with a sub-goal is true, locking module 808 locks the value of the importance coefficient of the sub-goal. Document attaching module 810 attaches one or more documents with the goal or sub-goals Favorite module 812 stores the goal and sub-goals as a favorite, based on the favorite state of the goal and sub-goals. For example, if the value of the favorite state of a sub-goal is true, the sub-goal is stored as a favorite. In an embodiment of the present invention, favorite module 812 provides easy access to the goal or sub-goals that are stored as favorite.

Information-transferring module 814 exports the information related to the goal and sub-goals, such as the agenda, in the first format to the second format. In various embodiments of the present invention, the second format may be imported by information-transferring module 814 or various software that supports the second format. Examples of the first format and the second format include, but are not limited to, the Microsoft Outlook™ format, the Microsoft Word™ format, the Extensible Markup Language (XML) format, the Hypertext Markup Language (HTML) format, the template (xlt) format and the text format. In an embodiment of the present invention, goal management system 800 imports the files, supported by software such as Microsoft Word™, Microsoft Outlook™, Microsoft Excel™ and Adobe Acrobat™, through information-transferring module 814.

Plug-in module 816 integrates one or more plug-ins with goal management system 800. The one or more plug-ins, such as a previewer, enhance the capabilities of goal management system 800 by adding the functionality of previewing the predefined file format in a browser. Examples of plug-ins may include, but are not limited to, browser helpers, toolbars, Active-X controls, and the like. In an embodiment of the present invention, the plug-ins may be integrated with various tools such as Really Simple Syndication (RSS) Readers and Blog Editors that may enhance the functionality of goal management system 800. In an embodiment of the present invention, plug-ins may be integrated with various software such as video conferencing software, Voice Over Internet Protocol (VOIP) software, Microsoft Word™, Microsoft Outlook™, Microsoft Excel™ and Adobe Acrobat™. The plug-ins will enable the software to work in conjunction with goal management system 800.

In various embodiments of the present invention, different elements of goal management system 800, such as division module 702, configuration module 704, processing module 802, graph-generating module 706, monitoring module 804, agenda generating module 806, locking module 808, document attaching module 810, favorite module 812, information-transferring module 814 and plug-in module 816, may be implemented as hardware modules, software modules, firmware, or their combination thereof. Division module 702, configuration module 704, processing module 702, graph-generating module 706, monitoring module 804, agenda generating module 806, locking module 808, document attaching module 810, favorite module 812, information-transferring module 814 and plug-in module 816 may be present on the machine of an individual or the team member using goal management system 800 or the Internet.

The method and the system described above have a number of advantages. They provide a visual representation of the hierarchy of a goal and its sub-goals, which helps to track the progress of the goal. It also determines an economical way of achieving and managing the goal. Further, it is a medium for the easy transfer of knowledge among the team members responsible for achieving the goal. Moreover, it helps to retain and motivate the members of the team and clarify responsibilities.

The goal management system for strategy development and resource management for achieving a goal, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer further comprises a microprocessor. The microprocessor is connected to a communication bus. The computer also includes a memory. The memory may include Random Access Memory (RAM) and Read Only Memory (ROM). The computer system further comprises a storage device. The storage device can be a hard disk drive or a removable storage drive such as a floppy disk drive, optical disk drive, etc. The storage device can also be other similar means for loading computer programs or other instructions into the computer system. The computer system also includes a communication unit. The communication unit allows the computer to connect to other databases and the Internet through an I/O interface. The communication unit allows the transfer as well as reception of data from other databases. The communication unit may include a modem, an Ethernet card, or any similar device which enables the computer system to connect to databases and networks such as LAN, MAN, WAN and the Internet. The computer system facilitates inputs from a user through input device, accessible to the system through I/O interface.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific goals such as the steps that constitute the method of the present invention. The set of instructions may be in the form of a software program. Further, the software may be in the form of a collection of separate programs, a program module with a larger program, or a portion of a program module, as in the present invention. The software may also include modular programming in the form of object-oriented programming. Processing of input data by the processing machine may be in response to user commands, results of previous processing, or a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

What is claimed is:

1. A computer implemented method for developing a strategy for achieving a goal, the computer implemented method comprising the steps of:
   a. dividing the goal into a plurality of first-generation sub-goals to form a goal hierarchy;
   b. dividing one or more of the plurality of first-generation sub-goals into one or more subsequent generations of sub-goals if a number of the one or more subsequent generations of sub-goals is less than a threshold value, wherein the threshold value represents a number of generations of sub-goals adequate to achieve the goal, each of the one or more subsequent generations of sub-goals being added to the goal hierarchy;
   c. defining at least one parameter associated with each of the plurality of first-generation sub-goals and each of the one or more subsequent generations of sub-goals of the goal hierarchy;
   d. determining a relative importance of each of the plurality of first-generation sub-goals and each of the one or more subsequent generations of sub-goals of the goal hierarchy based on the at least one parameter;
   e. generating a multi-level concentric representation of the goal hierarchy based on the at least one parameter, the multi-level concentric representation being a visual representation of the goal hierarchy to assist in tracking the progress of the goal and the sub-goals of the goal hierarchy, wherein a level of the multi-level concentric representation represents a generation of the sub-goals of the goal hierarchy, and the level is divided into a plurality of sectors, each of the plurality of sectors representing a sub-goal on the level, the sector size of each of the plurality of sectors in the multi-level concentric representation representing the relative importance of the corresponding sub-goal of the goal hierarchy; and
   f. coloring each of the plurality of sectors from the circumference of the corresponding sector towards the center of the multi-level concentric representation to track visually the progress of the corresponding sub-goal on the level,
   wherein the above steps are performed by a microprocessor included in a computer system.

2. The method according to claim 1, further comprising the step of
   displaying a graphical user interface (GUI) flag on the level representing the corresponding generation of the sub-goals,
   wherein the GUI flag is configured to change the size of each of the plurality of sectors representing the sub-goal on the level.

3. The method according to claim 1, further comprising the step of
   moving a first sub-goal from the displayed sub-goals to the center of the multi-level concentric representation based on the selection of the first sub-goal by a user.

4. The method according to claim 1, wherein the at least one parameter comprises one or more: a definition, an importance coefficient, a lock state, a percentage and time of completion associated with the sub-goals.

5. The method according to claim 1, wherein the shape of the multi-level concentric representation comprises one or more of: a two dimensional pie-chart, and a three dimensional pie-chart.

6. The method according to claim 1, further comprising the step of locking the at least one parameter associated with at least one of the sub-goals,
    wherein the step of locking locks the relative importance of the at least one of the sub-goals, and
    wherein the step of locking indicates that the relative importance of the at least one of the sub-goals does not change in case a new sub-goal is added to the level associated with the at least one of the sub-goals.

7. The method according to claim 1, wherein, when the relative importance of one of the sub-goals on the level increases, the corresponding relative importance of other of the sub-goals on the level decreases and wherein, when the relative importance of the one of the sub-goals on the level decreases, the corresponding relative importance of the other of the sub-goals on the level increases.

8. The method according to claim 1, further comprising the step of storing at least one of the sub-goals as favorite based on a favorite state, the favorite state being associated with each of the sub-goals.

9. A computer implemented goal management system for developing a strategy for achieving a goal, the computer implemented goal management system comprising:
    a. a microprocessor;
    b. a display unit configured to interact with the microprocessor;
    c. a division module, the division module configured to interact with the microprocessor to divide the goal into a plurality of sub-goals to form a goal hierarchy;
    d. a configuration module, the configuration module configured to interact with the microprocessor to define at least one parameter associated with each of the plurality of sub-goals of the goal hierarchy;
    e. a processing module, the processing module configured to interact with the microprocessor to determine a relative importance of each of the plurality of sub-goals of the goal hierarchy;
    f. a graph-generating module, the graph-generating module configured to interact with the microprocessor to generate a multi-level concentric representation of the goal hierarchy based on the at least one parameter, the multi-level concentric representation being a visual representation of the goal hierarchy, wherein a level of the multi-level concentric representation represents a generation of the plurality of sub-goals, and the level is divided into a plurality of sectors, each of the plurality of sectors representing one of the plurality of sub-goals on the level, the sector size of each of the plurality of sectors representing the relative importance of the corresponding one of the plurality of sub-goals of the goal hierarchy,
        wherein the graph-generating module is configured to color each of the plurality of sectors, at least one of: from the circumference of the corresponding sector towards the center of the multilevel concentric representation or from the center of the multilevel concentric representation towards the circumference of the corresponding sector, to represent the progress of the corresponding one of the plurality of sub-goals on the level; and
    g. a monitoring module, the monitoring module configured to interact with the microprocessor to track the progress of the goal and the plurality of sub-goals.

10. The computer implemented goal management system according to claim 9, wherein the configuration module comprises the processing module, the processing module processing the at least one parameter associated with the plurality of sub-goals of the goal hierarchy.

11. The computer implemented goal management system according to claim 9, wherein the monitoring module is configured to track the progress of the plurality of sub-goals of the goal hierarchy based on the at least one parameter.

12. The computer implemented goal management system according to claim 9, further comprising an information-transferring module, the information-transferring module transferring information related to the plurality of sub-goals from a first file format to a second file format.

13. The computer implemented goal management system according to claim 9, further comprising a plug-in module, the plug-in module integrating one or more plug-ins with the goal management system, the one or more plug-ins providing one or more functionalities to the computer implemented goal management system.

14. The computer implemented goal management system according to claim 9, further comprising an agenda generating module, the agenda generating module generating an agenda associated with the plurality of sub-goals of the goal hierarchy.

15. The computer implemented goal management system according to claim 9, wherein the shape of the multi-level concentric representation comprises one or more of: a two dimensional pie-chart, and a three dimensional pie-chart.

16. The computer implemented goal management system according to claim 9, further comprising a locking module, the locking module locking the relative importance of at least one of the plurality of sub-goals,
    wherein the locking indicates that the relative importance of the at least one of the sub-goals does not change in case a new sub-goal is added to the level associated with the at least one of the plurality of sub-goals.

17. The computer implemented goal management system according to claim 9, wherein, when the relative importance of the one of the plurality of sub-goals on the level increases, the corresponding relative importance of other of the plurality of sub-goals on the level decreases and wherein, when the relative importance of the one of the plurality of sub-goals on the level decreases, the corresponding relative importance of the other of the plurality of sub-goals on the level increases.

18. The computer implemented goal management system according to claim 9, further comprising a favorite module, the favorite module storing at least one of the plurality of sub-goals as a favorite based on a favorite state, the favorite state being associated with each of the plurality of sub-goals.

19. A computer program product for use with a computer, the computer program product comprising a non-transitory computer usable medium having a computer readable program code embodied therein for developing a strategy for achieving a goal, the computer readable program code containing instructions for:
    a. dividing the goal into a plurality of first-generation sub-goals to form a goal hierarchy;
    b. dividing one or more of the plurality of first-generation sub-goals into one or more subsequent generations of sub-goals if a number of the one or more subsequent generations of sub-goals is less than a threshold value, wherein the threshold value represents a number of generations of sub-goals adequate to achieve the goal, each of the one or more subsequent generations of sub-goals being added to the goal hierarchy;
    c. defining at least one parameter associated with each of the plurality of first-generation sub-goals and each of the one or more subsequent generations of sub-goals of the goal hierarchy;

d. determining a relative importance of each of the plurality of first-generation sub-goals and each of the one or more subsequent generations of sub-goals of the goal hierarchy based on the at least one parameter;

e. generating a multi-level concentric representation of the goal hierarchy based on the at least one parameter, the multi-level concentric representation being a visual representation of the goal hierarchy to assist in tracking the progress of the goal and the sub-goals of the goal hierarchy, wherein a level of the multi-level concentric representation represents a generation of the sub-goals of the goal hierarchy, and the level is divided into a plurality of sectors, each of the plurality of sectors representing a sub-goal on the level; and f. coloring each of the plurality of sectors from the circumference of the corresponding sector towards the center of the multi-level concentric representation to track visually the progress of the corresponding sub-goal on the level.

20. The computer program product according to claim 19, wherein the computer readable program code further containing instructions for displaying a graphical user interface (GUI) flag on the level representing the corresponding generation of the sub-goals, wherein the GUI flag is configured to change the size of each of the plurality of sectors representing the sub-goal on the level.

21. The computer program product according to claim 19, wherein the sector size of each of the plurality of sectors in the multi-level concentric representation representing the relative importance of the corresponding sub-goal of the goal hierarchy.

22. The computer program product according to claim 19, wherein the computer readable program code further containing instructions for locking the relative importance of at least one of the sub-goals, wherein the locking indicates that the relative importance of the at least one of the sub-goals does not change in case a new sub-goal is added to the level associated with the at least one of the sub-goals.

\* \* \* \* \*